(12) United States Patent
Howes et al.

(10) Patent No.: US 6,578,007 B1
(45) Date of Patent: Jun. 10, 2003

(54) GLOBAL DOCUMENT CREATION SYSTEM INCLUDING ADMINISTRATIVE SERVER COMPUTER

(75) Inventors: Simon L. Howes, Monroe, CT (US); Christopher D. Adams, North Hampton, NH (US)

(73) Assignee: Dictaphone Corporation, Stratford, CT (US)

(*) Notice: Subject to any disclaimer, the term of this patent is extended or adjusted under 35 U.S.C. 154(b) by 0 days.

(21) Appl. No.: 09/515,902

(22) Filed: Feb. 29, 2000

(51) Int. Cl.[7] .............................................. G06F 17/60
(52) U.S. Cl. ............................................. 705/9; 705/10
(58) Field of Search ........................................ 705/10, 9

(56) References Cited

U.S. PATENT DOCUMENTS 5,146,439 A * 9/1992 Jachmann et al. ....... 369/25.01
5,761,529 A * 6/1998 Raji et al. ..................... 710/4
5,828,730 A * 10/1998 Zybryk et al. ............ 379/88.27
5,875,436 A * 2/1999 Kikinis ........................ 705/34

OTHER PUBLICATIONS

Gillespie, Greg. "For Physician's, Talk is Cheap." Health Data Management; Sep. 1999.*

* cited by examiner

Primary Examiner—James P. Trammell
Assistant Examiner—James A. Reagan
(74) Attorney, Agent, or Firm—Howrey Simon Arnold & White, LLP; Anthony L. Meola

(57) ABSTRACT

A distributed dictation system includes a data communication network, an administrative server connected to the network, and a plurality of dictation servers connected to the network. The dictation servers store dictation jobs and selectively download the dictation jobs to transcriber stations connected to the dictation servers from time to time via the network. The administrative server receives log-on signals from the transcriber stations and selectively assigns the transcriber stations to dictation servers on the basis of assignment rules stored in the administrative server.

9 Claims, 3 Drawing Sheets

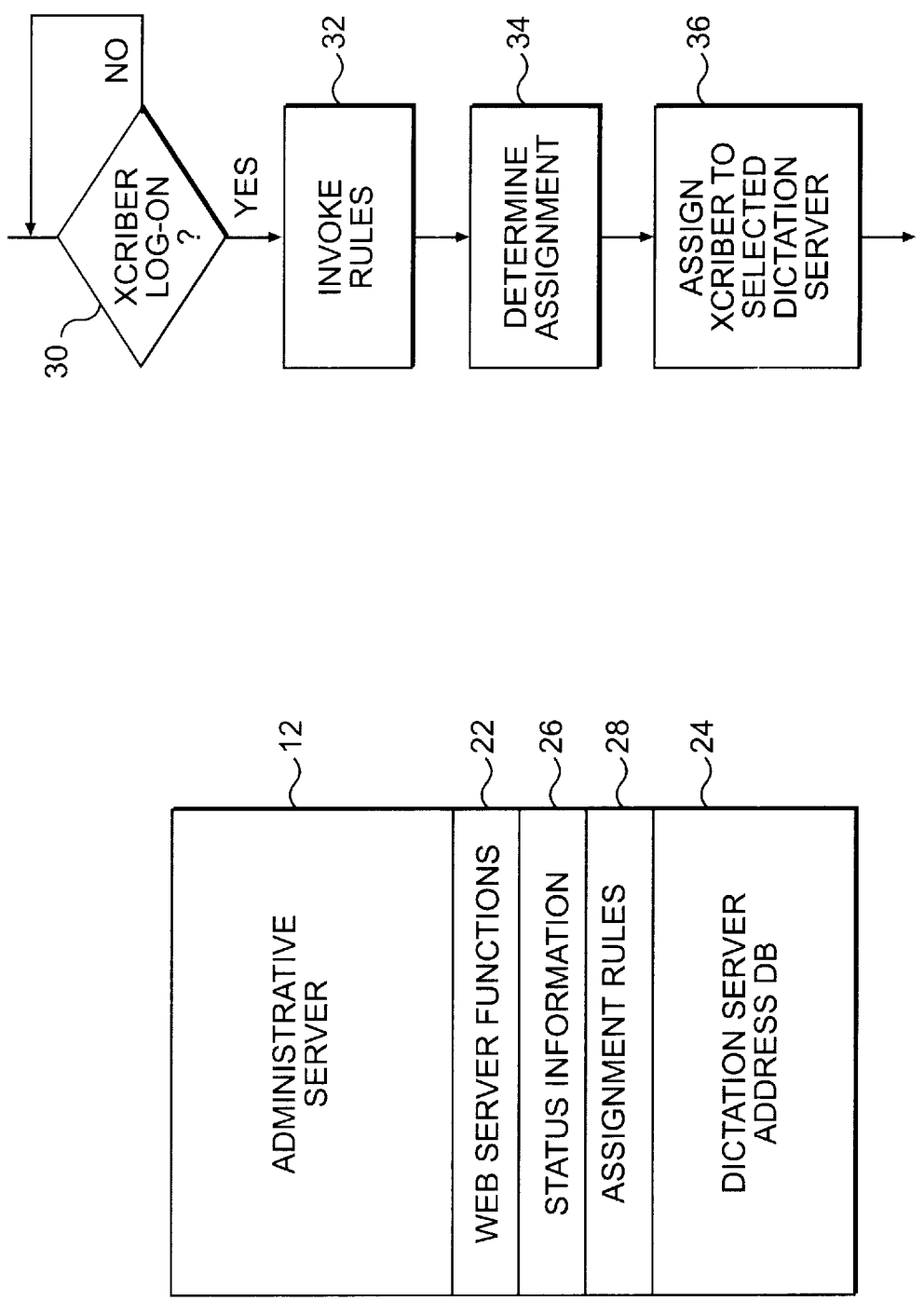

GLOBAL DOCUMENT CREATION SYSTEM INCLUDING ADMINISTRATIVE SERVER COMPUTER

FIELD OF THE INVENTION

This invention is concerned with document creation systems, and is more particularly concerned with such systems in which central dictation systems are connected to each other via a data communication network.

BACKGROUND OF THE INVENTION

Central dictation systems are well known. A typical central dictation system includes one or more computer hard disk drives used as a central recording facility for storing numerous dictation job files. Dictation job files generally are composed of digitally recorded voice information and auxiliary data. The voice information may have been inputted into the system via a dictation station connected to the central dictation system, or via a telephone dictation module, or via a docking station into which a portable recorder was inserted.

It is also typical for dictation stations to include a numeric keypad and/or an optical barcode reader. These devices are used to enter some elements of the auxiliary data relating to the dictation job. This data typically includes author-identifying information and file-identifying information. When the central dictation system is maintained in a hospital or medical facility, as is frequently the case, the author-identifying information identifies a particular physician or other medical professional who is creating the dictation job, as well as one or more of a patient number, a medical records number, and an accession number. Other auxiliary data which may be included in a dictation job file includes data that identifies the subject matter of the recorded voice data. For example, the auxiliary data may indicate that the accompanying voice information represents a physician's report on a physical examination and patient history, a radiologist's report, a pre-operative report, a post-operative report, a report on a bed-side visit, or a discharge-summary.

The auxiliary data may also include one or more data flags to indicate that the job is to receive special or priority handling, etc.

Other components found in typical central dictation systems are transcription stations that are connected to the central recorder. A transcription station functions to permit a transcriptionist at the station to control listening access to the voice information in a dictation job that has been assigned for transcription to the transcriptionist at the transcription station. The transcription station generally comprises a headset and/or speakers for audibly reproducing the voice data as well as a foot pedal for controlling playback functions. A personal computer or other hardware suitable for a word processing workstation is also present at the transcription station. In some cases, the foot pedal and headset may be connected as accessories to the personal computer, which is used in integrated fashion both to handle playback of the voice data files and to perform word processing functions. The transcriptionist at the transcription station uses the foot pedal and headset to play back the voice data for the dictation job and simultaneously keyboards corresponding text into the word processing workstation or PC to transcribe the dictation job. The resulting text may be integrated automatically with data imported from the central dictation system, to form a completed document. The document may then be circulated for review and/or distribution to one or more of the author or other interested parties.

Central dictation systems also typically include predetermined rules or other procedures for assigning dictation jobs among a plurality of transcriptionist currently logged in to the central dictation system. One example of a rule that may be used for assigning dictation jobs could be that all priority jobs are assigned to one transcriptionist, and all other jobs are assigned randomly among the other transcriptionist currently logged on to the system. Other rules may direct the system to accord priority treatment to certain types of dictation jobs. For example, in a hospital environment, pre-op reports may have priority over all other dictation jobs, so that surgical procedures may be carried out promptly after a pre-op examination. Discharge summaries may be accorded second priority, since approval of the discharge summary may be the last pre-requisite to launching the billing process for a hospital stay.

It is also known to interconnect two or more central dictation systems via a data communication network. In order to balance loads or backlogs in this arrangement, dictation jobs are transferred from one dictation system to another via the data communication network.

Although existing central dictation systems, and interconnected arrangements of dictation systems, have functioned satisfactorily for their intended purposes, it would be desirable to provide even greater flexibility in meeting the needs of dictation system users and administrators. It is also desirable to better accommodate the needs and working habits of transcriptionist, particularly as tele-commuting and work-at-home practices become more widespread.

OBJECTS AND SUMMARY OF THE INVENTION

It is accordingly an object of the invention to provide a geographically distributed dictation and document creation system in which transcriptionist may be freely assigned to receive dictation jobs from any recorder in the system.

According to a first aspect of the invention, a distributed computer dictation system includes a data-communication network, a first server computer connected to the data communication network, and a plurality of second server computers connected to the data communication network, where the second server computers each are programmed to store dictation job files and to selectively download the dictation job files to transcriber workstations connected to the second server computer from time to time via the data communication network, and the first server computer is programmed to receive log on signals from the transcriber workstations via the data communication network and to selectively assign transcriber workstations to respective ones of the second server computers in accordance with assignment rules stored in the first server computer.

According to another aspect of the invention, the system as described in the preceding paragraph is operated such that the first server computer, after having assigned a first transcriber workstation to a first one of the second server computers, is able to institute a transfer of that transcriber workstation from one of the second servers to another, by transmitting a transfer signal to the first one of the second server computers. In response to the transfer signal, the first one of the second server computers transfers the first subscriber workstation to the first server computer, which then assigns the subscriber workstation to a second one of the second server computers.

With the system and method of the present invention, transcriptionist located in a very wide range of geographic locations are freely assignable, by an administrative server computer, among any one of a large number of geographically dispersed central dictation systems. Transcriptionist are no longer tied to a single dictation system, but rather may be used as floaters within an interconnected dictation system that may be continental or global in scope.

Other objects, features and advantages of the invention will become apparent from the subsequent more detailed description of preferred embodiments.

BRIEF DESCRIPTION OF THE DRAWINGS

FIG. 2 schematically illustrates functions provided by an administrative server computer that is part of the system of FIG. 1.

FIG. 3 is a flow chart that illustrates a process by which the administrative server computer assigns a transcriber station to one of the dictation servers that are other components of the system of FIG. 1.

DESCRIPTION OF PREFERRED EMBODIMENTS

Figure 1:
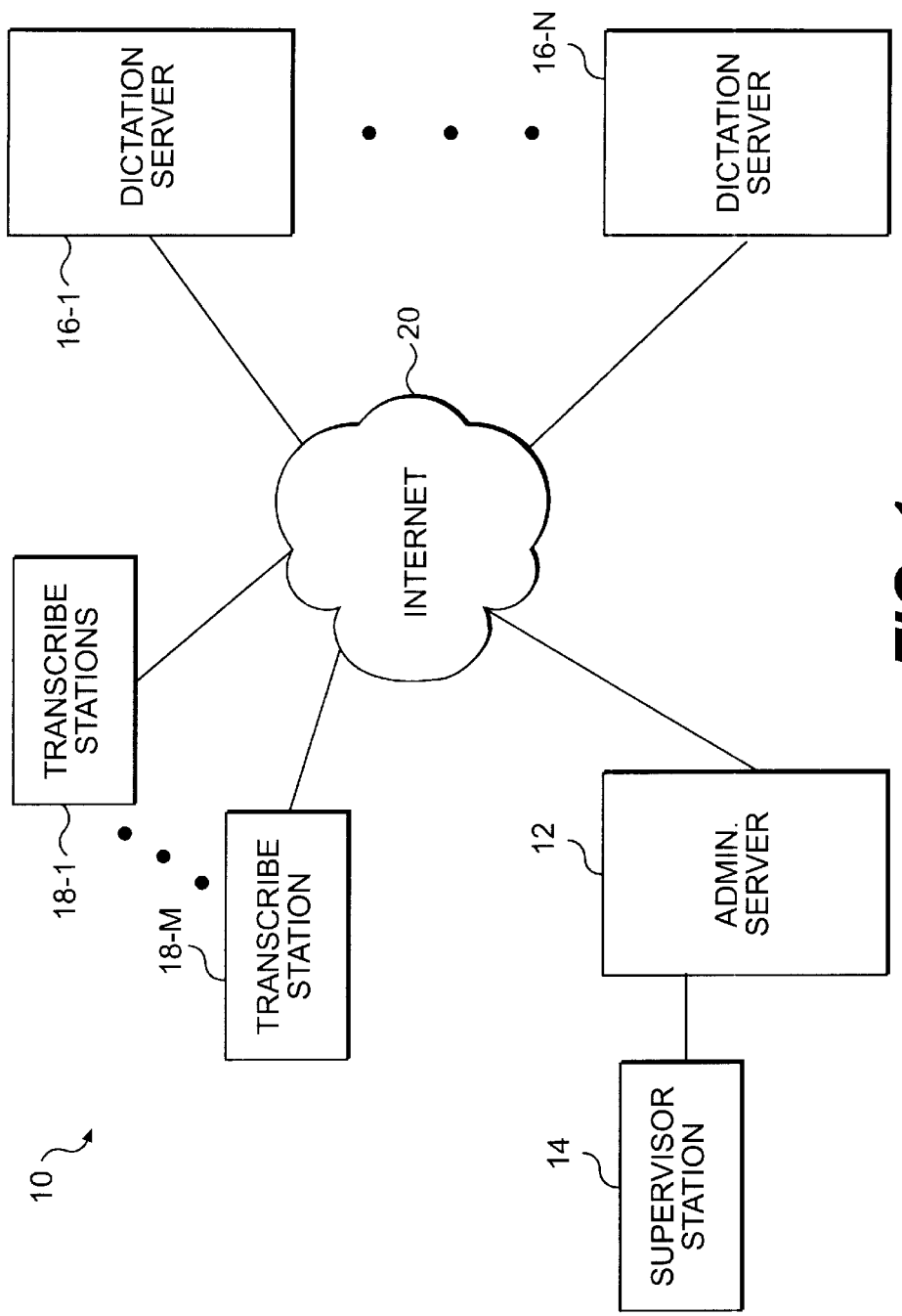
FIG. 1 is a block diagram representation of a distributed dictation system provided in accordance with the invention.

A preferred embodiment of the invention will now be described, initially with reference to FIG. 1. In FIG. 1 reference numeral 10 generally indicates a distributed dictation system provided in accordance with the invention. The system 10 may also be regarded as a document creation system because, as will be seen, it incorporates word processing and text document distribution capabilities as well as dictation recording and transcription capabilities.

A key component of the distributed dictation system 10 is an administrative server computer 12 that performs overall supervisory functions for the system 10, including novel functions provided in accordance with the invention and described below. Connected to administrative server 12 is a supervisor station 14, which may be a conventional personal computer or computer terminal.

Other major building blocks of the system 10 are dictation server computers 16-1 through 16-n. Though only two dictation servers 16 are explicitly shown in FIG. 1, it should be understood that the number of dictation servers included in the system may be quite large. The respective geographic locations of the servers 16 may be widely dispersed. For example, each of the servers 16 may be located in a different city, and the different cities may be hundreds or thousands of miles apart. The different cities may also be located in more than one country or on different continents. Thus the geographic scope of the system 10 may be global. Of course, two or more of the servers 16 may be located near to each other, say in the same city or even in the same building.

Preferably each of the dictation servers 16 has all of the capabilities found in the central server computers of conventional central dictation systems. In addition, dictation servers 16 are programmed to interact with the administrative server 12 and remote transcription stations in ways taught by the present invention and as will be described below. Although not shown in FIG. 1, it is to be understood that each dictation server 16 may have connected thereto a conventional array of voice input devices, including hard wired or dial up dictation stations, telephone interface devices, and/or docking stations that permit transfer of stored voice files to the dictation server 16 from portable digital recorders (which also are not shown). There may also be connected to the dictation servers 16 one or more supervisory stations, as well as dedicated transcriber stations.

The distributed dictation system 10 also includes remote transcriber stations 18-1 through 18-m. Again, although only two transcriber stations 18 are explicitly shown in the drawing, it should be understood that the system 10 may encompass a very large number of such stations. Moreover, such stations may be located anywhere in the world. Preferably the transcriber stations include a PC or other hardware suitable for performing client functions in a client/server processing environment. Also included in each of the transcriber stations 18-1 are components such as a headset and/or speakers for audibly reproducing dictation files downloaded to the transcriber stations as well as a foot pedal or similar control device for controlling playback functions. In addition, the transcriber stations 18 include a keyboard and a screen (not separately shown) and suitable word processing software to support text document creation and editing functions.

Indicated at 20 in FIG. 1 is a data communication network that permits data communication channels to be established among various components of the system 10. Preferably, the data communication network 20 is constituted by the world wide packet switched data network known as the "Internet". However, it is also contemplated to use, as an alternative or supplement to the Internet, one or more of conventional dedicated data lines, dial up data circuits, microwave or other wireless communication links and satellite data links.

FIG. 2 schematically illustrates program and data storage functions carried out by the administrative server 12. As will be seen, administrative server 12 operates as a web server with respect to transcriber stations 18 that access the administrative server 12 via the Internet 20. The web server functions of the administrative server 12 are represented by block 22.

In addition, the administrative server 12 stores a database of web addresses that correspond to the dictation servers 18. The dictation server address database is indicated by block 24. Also stored in administrative server 12 is job status information that is transmitted to the administrative server 12 from time to time by each of the dictation servers 16. The status information is represented by block 26 in FIG. 2, and preferably includes the number and time duration of each of the dictation jobs that are currently stored in each of the dictation server 16 and are awaiting transcription. The job information transmitted to the administrative server from the dictation servers may be presented in summary form, or may be detailed to the level of the individual dictation job. Preferably, the status information breaks down the jobs awaiting transcription into categories indicative of type of jobs and whether or not priority, handling is required. It is also preferred that the job status information stored in the administrative server be updated very frequently by each of dictation servers. The updates may be provided on a pre-scheduled basis, or as made desirable from time to time by changing circumstances. The job status information may also indicate the identities of transcriber stations currently assigned to each dictation server and additional data such as the rates at which the various transcriber stations are handling dictation jobs. Alternatively, this information may be stored separately from the status information. This information may also be provided for dedicated transcriber stations that are connected to the dictation servers and are not assignable by the administrative server.

The administrative server 12 also stores assignment rules (indicated at 28). The assignment rules control the administrative server 12 to dynamically assign transcriber stations 18 to dictation server computers 16, in accordance with the overall needs and priorities of the system, as those needs and priorities change from time to time. The assignment rules are applied to the stored job status information 26 to determine on a dynamic basis to which one of the dictation servers 16 a transcriber station 18 is to be assigned. The decision on assigning a transcriber station to a particular one of the dictation servers 16 is made at the time that the transcriber station logs on the administrative server 12 but may be reconsidered and a reassignment made at a later time as the needs and priorities of the overall system evolve over time. The status information 26 may include, in addition to the dictation jobs backlogs of the dictation servers 16, the status of each dictation server's own dedicated transcriptionist as well as the status of availability, anticipated availability and current assignments of the transcriber stations 18.

FIG. 3 is a flow chart that illustrates a process for assigning a transcriber station to a dictation server on the occasion of the transcriber station logging on to the system. When a transcriptionist who operates one of the transcriber stations 18 is ready to commence work, he or she uses a web browser program or the like in his or her respective transcriber station 18 to access the administrative server 12 through the Internet 20. The occurrence of this event from time to time is represented by decision block 30 in FIG. 3. Each time a transcriber station 18 logs on to the administrative server 12, the assignment rules 28 are invoked and applied to the current job status information 26 to determine the one of the dictation server 16 to which the newly logged on transcriber station should be assigned. (These activities are represented by steps 32 and 34 in FIG. 3.)

There are myriad factors that the assignment rules 28 may take into account in determining the assignment of the newly logged on transcriber station. For example, particular special capabilities of the transcriptionist associated with the transcriber station may be taken into account such that the transcriber station is assigned to dictation server 16 that is need of the respective transcriptionist's special capabilities. To give one example, the particular dictation server may be holding dictation jobs from a foreign born author whose accent can be deciphered with relative ease by the transcriptionist who has just logged on. The assignment rules may also take into account various contractual obligations and/or contract incentives that are relevant to the operation of the dictation system 10.

To give some concrete examples, let it be assumed that the dictation system 10 is operated by an independent contractor who provides document creation/medical records services to a large and geographically dispersed hospital chain. The contractor who operates the system may be contractually obligated to provide a turn-around time of no more than one hour for certain class of dictation jobs, such as pre operative reports. The contract for operation of the system may also call for a financial incentive for the contractor/system operator to turn around discharge summary reports within a certain period of time, because the hospital chain is able to initiate billing procedures when the discharge summary report is complete. Preferably, the assignment rules 28 are designed to take into account contractual obligations and incentives, job priorities declared by the dictation servers and/or prescribed by the stored rules themselves, the capabilities of the available transcriptionist, as well as other factors that tend to lead to an efficient allocation of the available transcriber resources to the needs of the various dictation servers. The assignment rules may also be amended "on the fly" and/or over ridden on the basis of input received from a human supervisor via supervisor station 14.

After the assignment rules are invoked at step 32 and a particular dictation server 16 to which the newly logged on transcriber is to be assigned is determined at step 34, step 36 follows. At step 36, the administrative server 12 retrieves from the dictation server address database 24 the web address that corresponds to the particular dictation server 16 selected to receive the assignment of the transcriber station at step 34. Using the retrieved address, the administrative server 12 causes the transcriber station 18 to be placed in data communication with a selected dictation server 16. Alternatively, the server 12 may send to the transcriber station in question a hyperlink to the selected dictation server; the transcriptionist then may actuate the link to place the transcriber station in a client/server relation with the selected dictation server. Any further required log on procedures are then performed, and the selected dictation server 16 proceeds to download dictation jobs, either one at a time or in batches, to the transcriber station 18.

One of the advantages of the present invention is that the administrative server can respond to changing job load either in any one of the dictation servers 16, or across the system as a whole, by reassigning the available transcription resources in real time. This is possible because dictation servers 16 either transmit updated job status information to the administrative server 12 at regular intervals, and/or provide updated status information whenever the status of the job backlog at the dictation server 16 changes substantially. The administrative server 12 can also react to an event which decreases the available transcription resources (such an event being, for example, a transcriptionist completing his or her work shift and logging off) by reassigning one or more transcriptionist from one dictation server to another.

Figure 4:
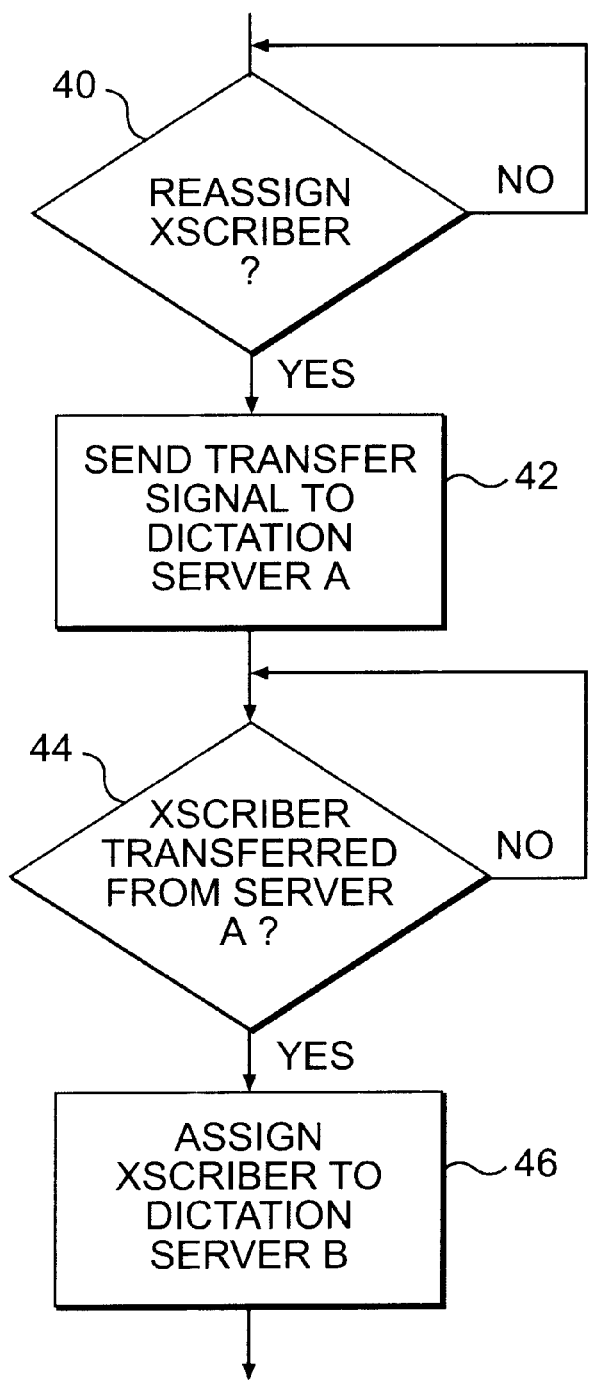
FIG. 4 is a flow chart that illustrates a procedure by which a transcriber is reassigned from one dictation server of the system to another.

FIG. 4 is a flow chart that illustrates a process by which a reassignment of a transcriber station is accomplished. As noted before, this may be done in response to changes in work demand or transcriptionist resources, or for other reasons.

In FIG. 4, decision block 40 is indicative of a decision as to whether it is appropriate to reassign a transcriber station from one dictation server to another. It may be assumed that the decision represented by decision block 40 is based on an application of assignment rules 28 (FIG. 2) to one or more of current job status information 26 and the present availability of transcription resources. The assignment rules 28 preferably also include rules that indicate when the assignment rules are to be applied. Thus, the balance between dictation jobs waiting to be performed and available transcription resources may be evaluated at regular intervals and/or in response to significant events indicative of changing conditions. The types of changing conditions have been described above.

In any event, assuming that it is determined at decision block 40 that it is appropriate to reassign a transcriber station from one dictation server (call it "dictation server A") to another dictation server (say "dictation server B"), then step 42 follows decision block 40. At step 42, administrative server 12 sends a signal to the dictation server A directing the dictation server A to transfer the transcriber station in question to the administrative server 12. It is then determined, at decision block 44, whether the transfer has been carried out. (Although not shown in the drawing, a time out function may be included so that a second transfer signal is sent to dictation server A in the event that the transfer of the transcriber station does not occur within a predetermined period of time.) Once it is determined that transfer of the transcriber station to the administrative server has occurred, then step 46 follows. At step 46 the administrative server 12 proceeds to assign to dictation server B the transcriber station that was transferred from the dictation server A. The dictation server B then downloads one or more dictation jobs to the transcriber station that has just been assigned thereto.

In addition to providing load balancing functions through assigning newly logged on transcription resources and/or re assigning transcription resources according to assignment rules, it is also contemplated that the administrative server 12 may perform load balancing by directing one or more of the dictation servers 16 to transfer dictation job files to one or more other dictation servers.

Within each of the dictation servers 16, conventional practices may be employed to assign dictation jobs among the transcriber stations currently assigned to the respective dictation server.

The word processing and document transmission capabilities of the system 10 have not been described in detail since these aspects of the system may be substantially the same as those provided in conventional systems. Suffice to say that each transcriptionist enters text through the keyboard of his or her transcriber station, and the resulting text document is transmitted, in real time or in batch mode, to the dictation server to which the transcriber station is assigned. The dictation server includes conventional capabilities for making the text document available for review by the author and/or for delivering the text document to the author or other interested parties.

The document creation system of the present invention is suitable for use in large, complex organizations that span wide distances and encompass multiple facilities. Transcription resources may be drawn from a very wide area, indeed from anywhere in the world, and may be efficiently deployed to satisfy the needs of many separate dictation systems. The present invention, in a preferred embodiment, capitalizes on the flexibility provided by the Internet to accommodate flexible scheduling and stationing of transcription workers. The present invention also extends the reach of dictation system supervisory personnel so that one centralized supervisor or staff of supervisors can oversee and coordinate operation of many dictation systems located at numerous locations.

Although the foregoing description has assumed that conversion of dictation jobs to text documents is performed entirely by human transcriptionist, it is also contemplated that speech recognition software may be included in the system 10, in some or all of the dictation servers 16 and/or in some or all of the transcriber stations 18. If speech recognition software is employed, then the transcriptionist's role becomes one of comparing the software generated text with the voice information in the corresponding dictation job in order to detect errors and make corrections in the software generated text. Accordingly, the term "transcriber station" should be understood to include both a conventional word processing/dictation playback station as well as a station at which the results of automatic speech recognition are reviewed and corrected.

Particular illustrative examples provided above have portrayed the invention in the context of a system of hospitals. Of course, it is contemplated to employ the invention in connection with many other types of enterprises.

It is also to be understood that the above description may indicate to those skilled in the art additional ways in which the principles of this invention may be used without departing from spirit of the invention. The particularly preferred methods and apparatus are thus intended in an illustrative and not limiting sense. The true spirit and scope of the invention are set forth in the following claims.

What is claimed is:

1. A distributed dictation system, comprising:
   a data communication network;
   a first server computer connected to the data communication network; and
   a plurality of second server computers connected to the data communication network, the second server computers each being programmed to store dictation job files and to selectively download the dictation job files to transcriber workstations connected to the second server computers from time to time via the data communication network;
   the first server computer being programmed to receive log on signals from the transcriber workstations via the data communication network and to selectively assign the transcriber workstations to respective ones of the second server computers in accordance with assignment rules stored in the first server computer.

2. A system according to claim 1, wherein the first server computer receives information from the second server computers concerning the dictation job files stored in the second server computers.

3. A system according to claim 2, wherein the first server computer applies the assignment rules to the information concerning the dictation job files stored in the second server computers.

4. A system according to claim 1, wherein the communication network is the Internet.

5. A method of operating a distributed dictation system, the system comprising a first server computer and a plurality of second server computers connected to the first server computer via a data communication network, the second server computers each being programmed to store dictation job files and to selectively download the dictation job files to transcriber workstations connected to the second server computers from time to time via the data communication network, the method comprising the steps of:
   receiving log on signals from transcriber workstations at the first server computer; and
   selectively assigning the transcriber workstations to respective ones of the second server computers in accordance with assignment rules stored in the first server computer.

6. A method according to claim 5, further comprising the step of transmitting from the second server computers to the first server computer information concerning the dictation job files stored in the second server computers.

7. A method according to claim 6, further comprising the step of applying the assignment rules to the transmitted information concerning the dictation job files stored in the second server computers.

8. A method of operating a distributed dictation system, the system comprising a first server computer and a plurality of second server computers connected to the first server computer via a data communication network, the second server computers each being programmed to store dictation job files and to selectively download the dictation job files to transcriber workstations connected to the second server computers from time to time via the data communication network, the method comprising the steps of:
   assigning a first transcriber workstation to a first one of said second server computers; and
   transmitting a transfer signal from the first server computer to said first one of said second server computers;
   in response to said transfer signal, transferring the transcriber workstation to the first server computer; and assigning the transferred transcriber workstation to a second one of said second server computers according to predetermined assignment rules stored in said first server computer.

9. A method of operating a distributed dictation system, the method comprising the steps of:

storing predetermined assignment rules regarding dictation jobs stored on a plurality of dictation server computers;

receiving dictation job status and load balancing information from the plurality of dictation server computers;

storing the received job status and load balancing information;

receiving log on signals from a transcriber workstation;

logging on the transcriber workstation;

determining from the received job status and load balance information and the assignment rules where a transcriber is required;

determining whether any of the assignment rules are applicable to the logged on transcriber workstation;

transferring dictation job files as needed between the plurality of dictation job server computers based upon the job status and load balancing information and the assignment rules; and assigning the logged on transcriber workstation to one of the plurality of dictation server computers based on the job status and load balancing information and the assignment rules.

* * * * *